United States Patent
Roge et al.

(10) Patent No.: US 9,291,068 B2
(45) Date of Patent: Mar. 22, 2016

(54) LOW PRESSURE STEAM TURBINE SEAL ARRANGEMENT

(71) Applicant: ALSTOM Technology Ltd, Baden (CH)

(72) Inventors: Julien Roge, Clichy (FR); Jerome Lamaque, Pontoise (FR); Xavier Laurent, Villepinte (FR)

(73) Assignee: ALSTOM Technology Ltd, Baden (CH)

(*) Notice: Subject to any disclaimer, the term of this patent is extended or adjusted under 35 U.S.C. 154(b) by 9 days.

(21) Appl. No.: 14/488,560

(22) Filed: Sep. 17, 2014

(65) Prior Publication Data
US 2015/0001814 A1     Jan. 1, 2015

Related U.S. Application Data

(63) Continuation of application No. PCT/EP2013/055676, filed on Mar. 19, 2013.

(30) Foreign Application Priority Data

Mar. 20, 2012   (EP) ..................................... 12290096

(51) Int. Cl.
*F01D 25/26*   (2006.01)
*F01D 11/00*   (2006.01)
(Continued)

(52) U.S. Cl.
CPC .............. *F01D 11/005* (2013.01); *F01D 25/28* (2013.01); *F01D 25/30* (2013.01); *F16J 15/021* (2013.01); *F05D 2240/57* (2013.01)

(58) Field of Classification Search
CPC ............................ F16J 15/0887; F01D 11/005
See application file for complete search history.

(56) References Cited

U.S. PATENT DOCUMENTS

| | | |
|---|---|---|
| 3,313,517 A | 4/1967 | Hanschke et al. |
| 5,104,286 A | 4/1992 | Donlan |

(Continued)

FOREIGN PATENT DOCUMENTS

| | | |
|---|---|---|
| CN | 1049893 A | 3/1991 |
| CN | 1294248 A | 5/2001 |

(Continued)

OTHER PUBLICATIONS

Office action issued from Chinese Patent Office dated Jul. 3, 2015 for CN Application No. 201380015311.9.

*Primary Examiner* — Gilbert Lee

(57) ABSTRACT

A seal arrangement is installed between confronting co-planar portions of a low pressure steam turbine exhaust hood and a circular bulkhead that forms part of an exhaust duct structure of a steam turbine module. The seal arrangement forms a vacuum seal between the interior and exterior of the exhaust hood and comprises a flexible gasket in the form of an annular diaphragm. This diaphragm has a radially inner circumferential portion that seals with the bulkhead, a radially outer circumferential portion that seals with the exhaust hood, and a radially median resilient portion. Sealing is achieved by providing radially inner and outer clamping flanges operative to sealingly clamp inner and outer circumferential portions of the gasket to the bulkhead and the exhaust hood respectively. To enable quick access to the interior of the exhaust hood, the clamping flanges comprise upper and lower halves and the upper part of the gasket is sealed to the upper parts of the exhaust hood and the bulkhead by an arrangement of flanges and counter-flanges, the counter-flanges being releasably secured to outside surfaces of the exhaust hood and the bulkhead.

6 Claims, 2 Drawing Sheets

(51) Int. Cl.
*F01D 25/28* (2006.01)
*F01D 25/30* (2006.01)
*F16J 15/02* (2006.01)

(56) References Cited

U.S. PATENT DOCUMENTS 5,779,435 A 7/1998 Lageder et al.
6,203,025 B1 * 3/2001 Hayton ................ 277/644
2011/0185737 A1 * 8/2011 Dierberger et al. ......... 60/752

FOREIGN PATENT DOCUMENTS

| DE | 2 200 447 A1 | 12/1972 | |
|---|---|---|---|
| DE | WO 2012136632 A1 * | 10/2012 | ......... F16C 33/6685 |
| GB | 1205912 A | 9/1970 | |
| JP | 2006-312885 A | 11/2006 | |

* cited by examiner

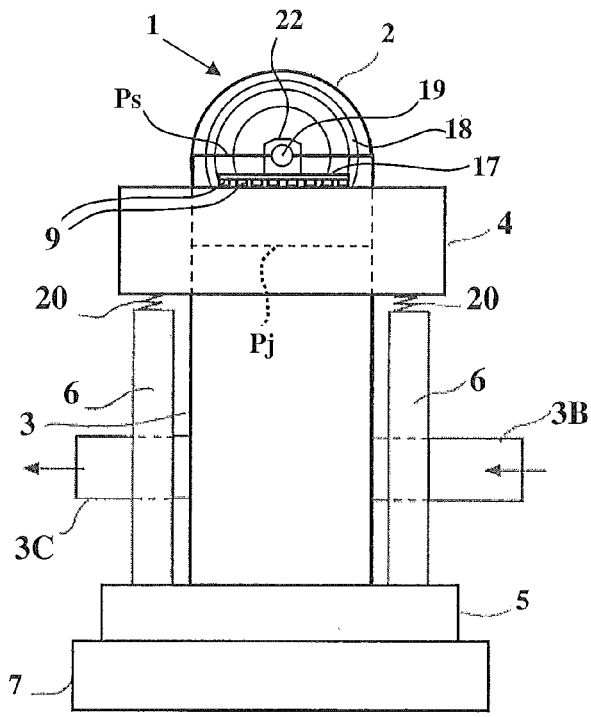
*FIG. 1*
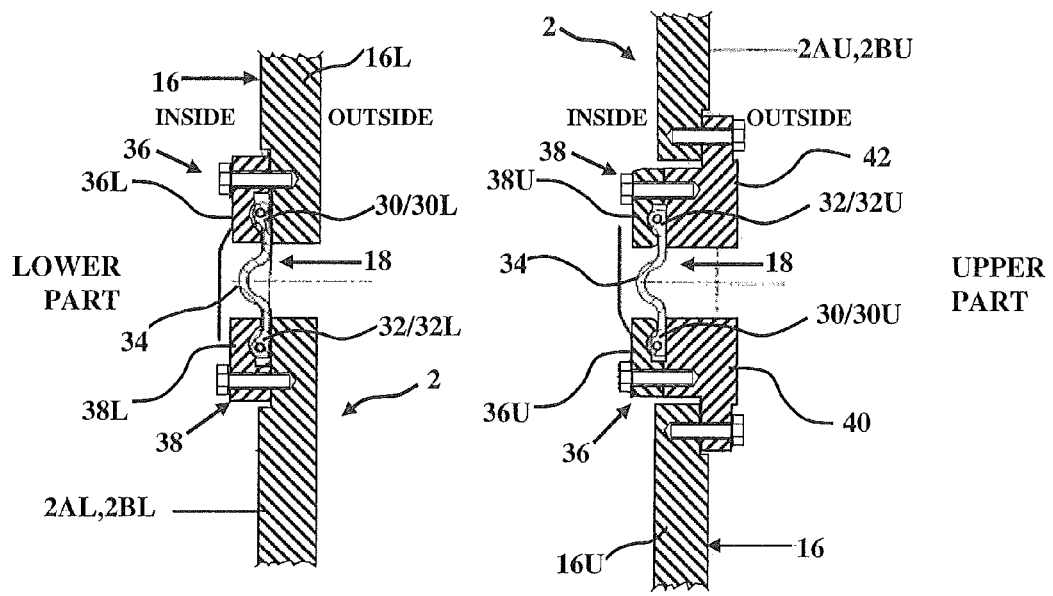
*FIG. 3*  *FIG. 4*

LOW PRESSURE STEAM TURBINE SEAL ARRANGEMENT

CROSS-REFERENCE TO RELATED APPLICATIONS

This application claims priority to PCT/EP2013/055676 filed Mar. 19, 2013, which claims priority to European application 12290096.2 filed Mar. 20, 2012, both of which are hereby incorporated in their entireties.

TECHNICAL FIELD

The present disclosure relates to large steam turbines of the type used in power stations to convert the thermal energy of steam produced by a boiler to mechanical energy, which is then used to drive an electrical generator. The disclosure particularly relates to a vacuum seal arrangement effective to seal between an exhaust hood and the casing of a low pressure steam turbine contained within the exhaust hood.

BACKGROUND

Steam turbines of the above type comprise a high-pressure module, usually a medium-pressure module, and at least one low-pressure module. In some installations there may be several low pressure modules. High pressure, high temperature steam from the boiler is routed to the high-pressure turbine module and then in turn to the medium-pressure and low-pressure turbine modules as the temperature and pressure of the steam is reduced due to extraction of energy by the turbines. Finally, the steam exhausts from the, or each, low pressure turbine module into a condenser.

In the specific arrangements disclosed herein, the or each low-pressure turbine module has an external casing, called the exhaust hood, and an internal turbine casing from which steam exhausts into the exhaust hood. Steam then passes from the exhaust hood into a condenser, which is located below the exhaust hood. The turbine casing is an assembly comprising (a) a generally cylindrical casing portion that contains axial flow, low pressure steam turbine stages, and (b) a diffusing exhaust duct structure arranged to turn the steam flow away from its axial path at the exit of the turbine and exhaust it radially outwards into the exhaust hood. The exhaust hood encloses the turbine casing, but does not support it, whereas the walls of the exhaust hood and the condenser are joined rigidly together and hence form an assembly distinct from the turbine casing. During operation of the turbine, the pressure of the steam in the condenser and at the exit of the low-pressure turbine is only of the order of a few tens of millibars, so the exhaust duct structure, the exhaust hood and the condenser must together form a steam- and air-tight enclosure, which may be considered as a vacuum enclosure.

The steam turbine has a turbine rotor shaft, which penetrates the exhaust duct structure in order to transmit mechanical power to the electrical generator outside the turbine module. The rotor shaft is supported in bearing assemblies that are integrated into the exhaust duct structure of the turbine casing through bearing supports, which in turn are connected to and supported by a massive concrete foundation block. To limit the loading on the foundation block, it is arranged that it bears only the weight of the turbine casing and its contents, the combined weight of the turbine and the foundation block being borne by a civil engineering structure underneath the foundation block. The combined weight of the exhaust hood and condenser is transmitted to a base plate of the civil engineering structure independently of the load path that transmits the combined weight of the turbine and the foundation block.

To facilitate assembly and disassembly of the turbine module, the exhaust hood, the turbine casing (including the exhaust duct structure) and the bearing assemblies each comprise a lower part and an upper part, which are bolted and sealed together along bolting flanges at a common plane.

A number of problems must be addressed simultaneously in the design of an efficient vacuum seal for the turbine module.

(a) Structural isolation of the exhaust hood from the turbine casing, which is consequent on the weights of the turbine and the exhaust hood being supported independently of each other, must not be compromised by the vacuum seal.

(b) Dynamic isolation of the exhaust hood from the turbine casing must be maintained during operation, particularly during start-up and run-down of the turbine, against thermally induced axial and radial movements (growth and shrinkage) of the turbine casing relative to the exhaust hood. Additionally, there may be transient movements of the turbine casing as the turbine adjusts to onset and removal of steam loading on the turbine rotor blades and diaphragms and changes of clearances during thermal growth and shrinkage. Furthermore, the exhaust hood/condenser enclosure will also experience thermally induced growth and shrinkage at different rates and amounts from the turbine casing and rotor, Hence, the vacuum seal must not interfere with the dynamic isolation of the exhaust hood and turbine casing.

(c) For operational and maintenance purposes the alignment of the turbine rotor shaft should be adjustable without the need to enter the turbine module enclosure and without interfering with the integrity of the vacuum seal.

SUMMARY

Accordingly, a vacuum seal arrangement is installed between confronting co-planar portions of the exhaust hood and a circular bulkhead or partition that forms part of the exhaust duct structure. The vacuum seal arrangement forms seals between the interior and exterior of the exhaust hood and may comprise a flexible gasket in the form of an annular diaphragm having:

a radially inner circumferential portion for sealing with the bulkhead;
a radially outer circumferential portion for sealing with the exhaust hood; and
a radially median resilient portion;

wherein sealing is achieved by providing radially inner and outer clamping flanges operative to sealingly clamp the inner and outer circumferential portions of the gasket to the bulkhead and the exhaust hood respectively.

The radially median resilient portion of the gasket is effective to structurally and dynamically decouple the turbine casing and the turbine rotor from the exhaust hood and condenser while maintaining an efficient seal. Moreover, during installation and maintenance of the turbine module, the gasket facilitates adjusting the alignment of the turbine rotor shaft relative to the foundation block from which its bearings are supported.

Preferably, the radially median resilient portion of the gasket comprises a portion that is convex towards the interior of the exhaust hood.

To facilitate manufacture, and also to assist assembly and disassembly of the gasket, the clamping flanges are segmented, the segments comprising semi-circular upper and lower half-flanges, a diametral joint line between the segments being coincident with a sealing plane between upper and lower parts of the exhaust duct structure and the exhaust hood.

To provide adequate support of the turbine, the concrete foundation block previously mentioned closely surrounds the lower part of the exhaust hood such that the turbine module appears partly submerged in the foundation block up to a level just below the rotor shaft bearing assemblies, the latter being fixed to the foundation block through bearing support structure. As a result, the lower part of the gasket cannot conveniently be secured to the outside surfaces of the lower parts of the exhaust hood and the turbine exhaust duct structure because the foundation block is closely adjacent to them. Consequently, the gasket must be clamped to interior surfaces of the exhaust hood and the exhaust duct structure. Although the lower part on the exhaust hood, once in place, is never removed except in case of major damage, clamping of the gasket to the interior surfaces is inconvenient when it is desired to remove the upper part of the exhaust hood to access the interior during outage of the turbine or for regular maintenance.

In a further aspect, it is proposed to facilitate removal of the upper part of the exhaust hood by sealing the upper part of the gasket to the upper parts of the exhaust hood and the exhaust duct structure bulkhead by means of an arrangement of flanges and counter-flanges. In a preferred arrangement:

the upper half of the radially inner clamping flange is releasably secured to an inside surface of a radially inner counter-flange, and the radially inner counter-flange is releasably secured to an outside surface of the upper part of the bulkhead;

the upper half of the radially outer clamping flange is releasably secured to an inside surface of a radially outer counter-flange, and the radially outer counter-flange is releasably secured to an outside surface of the upper part of the exhaust hood;

the radially inner circumferential portion of the upper part of the gasket is sealingly clamped between the upper half of the radially inner clamping flange and the radially inner counter-flange; and the radially outer circumferential portion of the upper part of the gasket is sealingly clamped between the upper half of the radially outer clamping flange and the radially outer counter-flange.

Due to the proximity of the concrete foundation block, the lower part of the gasket is fixed to the lower parts of the exhaust hood and the exhaust duct structure bulkhead by means of an arrangement wherein:

the lower half of the radially inner clamping flange is releasably secured to an inside surface of the lower part of the bulkhead;

the lower half of the radially outer clamping flange is releasably secured to an inside surface of the lower part of the exhaust hood;

a radially inner circumferential portion of the lower part of the gasket is sealingly clamped between the lower half of the radially inner clamping flange and the inside surface of the lower part of the bulkhead; and a radially outer circumferential portion of the lower part of the gasket is sealingly clamped between the lower half of the radially outer clamping flange and the inside surface of the lower part of the exhaust hood.

The flanges can be releasably secured by bolts or the like.

The above-described arrangement of flanges and counter-flanges facilitates access to interior of the turbine module. If the upper part of the exhaust hood is unbolted from the lower half and the counter-flange segments are released from the outside surfaces of the upper part of the exhaust hood, the upper part of the exhaust hood can then be lifted off the lower part.

BRIEF DESCRIPTION OF THE DRAWINGS

Embodiments of the above-described design will now be described, by way of example only, with reference to the accompanying drawings, in which:

FIG. 1 shows diagrammatically the configuration of a civil engineering structure supporting a low pressure steam turbine module and its condenser;

FIG. 3 is a sectional view showing the lower part of a gasket arrangement that seals between the exhaust hood and the steam turbine casing; and FIG. 4 is a sectional view showing the upper part of the gasket arrangement.

DETAILED DESCRIPTION

Figure 2:
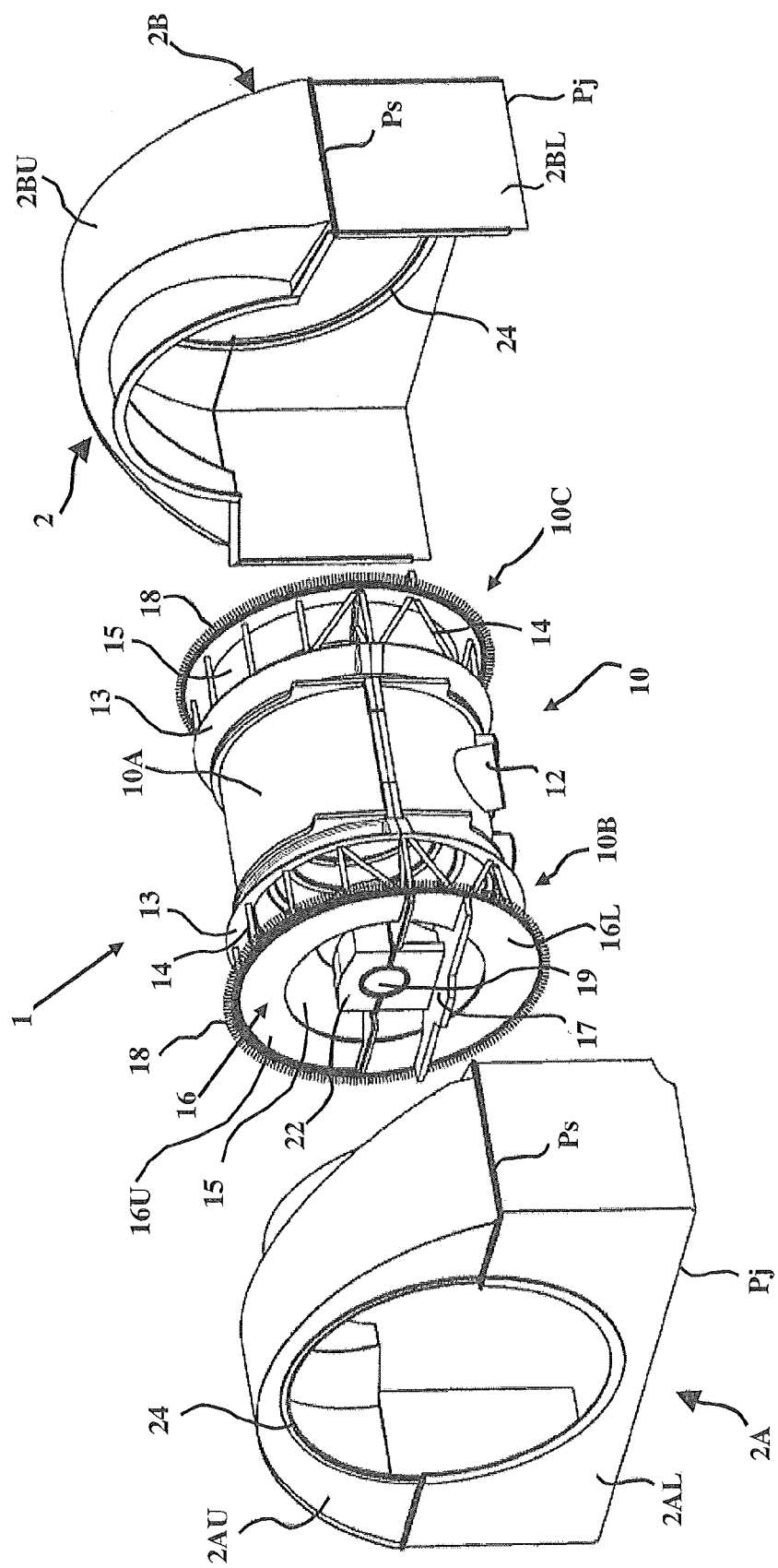
FIG. 2 is an axially exploded perspective view showing a steam turbine casing situated within an exhaust hood that directs steam into the condenser after it is exhausted from the turbine.

FIG. 1 illustrates the relationship of the turbine module 1 to the main components of the civil engineering structure which supports it, comprising a foundation block 4, posts 6 a base plate 5, and a floor 7. Referring to FIGS. 1 and 2, in the specific arrangements disclosed herein, the or each low-pressure steam turbine module 1 has an external casing 2, called the exhaust hood, and an internal turbine casing 10. The exhaust hood 2 encloses the turbine casing 10, but does not support it.

The steam turbine casing 10 has a centrally located steam inlet 12, from whence the steam is divided to flow symmetrically in both axial directions through turbine blade stages (not shown), to be exhausted through a diffusing exhaust duct structure 10B, 10C at each end of a central, generally cylindrical portion 1 OA of the turbine casing 10. Hence, the turbine casing 10 comprises (a) the generally cylindrical central casing portion 10A that contains the axial flow, low pressure steam turbine (not shown), and (b) the essentially identical diffusing exhaust duct structures 10B, 10C.

The exhaust duct structures 10B, 10C are arranged to turn the steam flow away from its axial path at the exits of the turbine and exhaust it radially outwardly into the exhaust hood 2, which then directs it into a condenser 3, located beneath the exhaust hood 2, underneath a massive concrete foundation block 4. During operation of the turbine, the pressure of the steam in the condenser 3 and at the exit of the low-pressure turbine is only of the order of a few tens of millibars, so the exhaust duct structures 10B, 10C, the exhaust hood 2 and the condenser 3 must together form an air- and steam-tight enclosure, which may be considered as a vacuum enclosure.

Cooling water enters the interior of the condenser 3 through an inlet duct 3B and exits through an outlet duct 3C.

The steam turbine has a turbine rotor shaft 19, which penetrates the exhaust duct structure 10B in order to transmit mechanical power to an electrical generator (not shown) outside the turbine module. The rotor shaft 19 is supported in bearing assemblies 22 at each end of the turbine casing 10. These bearing assemblies 22 are integrated into the exhaust duct structures 10B, 10C of the turbine casing 10 through bearing support plates 17, which in turn are fixed to and supported by the foundation block 4 through bearing support pillars 9. Though relatively short, the pillars 9 are adjustable, as necessary, to allow the position of the shaft 19 and turbine casing 10 relative to the foundation block 4 to be adjusted, thereby adjusting shaft alignment, if that is required during erection or maintenance of the turbine module 1. These pillars 9 may for example comprise screw-jack actuators and/or consist of simple wedge bearing surfaces.

To facilitate assembly of the turbine module 1, the exhaust hood 2, the turbine casing 10 and the bearing assemblies 22 each comprise a lower part and an upper part, which are bolted and sealed together along bolting flanges (not shown) at a common seal plane Ps.

As can be best appreciated from FIG. 2, the exhaust hood 2 further comprises a front part 2A and a rear part 2B. The front part 2A comprises a lower part 2AL and an upper part 2AU bolted together at the seal plane Ps. Similarly, the rear part 2B comprises a lower part 2BL and an upper part 2BU bolted together at the seal plane Ps. The exhaust hood 2 is rigidly joined to the condenser 3 at a joint plane Pj.

Each exhaust duct structure 10B, 10C comprises:
- an annular steam diffuser duct 13, which is coaxial with the central portion 10A of the turbine casing 10 and is divergent in the downstream axial direction (note, only the outer wall of the annular duct is illustrated);
- a frustum of a hollow cone 15 that is arranged coaxially with the diffuser duct 13 but that diverges away from the diffuser duct's exit and whose function is to help turn the steam radially outwardly into the exhaust hood 2; and
- a vertically oriented annular plate or bulkhead 16, which fits within a circular hole 24 provided in the front and rear parts 2A, 2B of the exhaust hood.

The small diameter end of the cone 15 is contiguous with the radially inner wall (not shown) of the annular diffuser, duct 13. The assembly comprising the cone 15 and the bullthead 16 is fixed to the radially outer wall of the diffuser duct 13 by tie-rods 14 that extend across the outlets from the exhaust duct structures 10B, 10C.

To limit the loading on the foundation block 4, it bears only the weight of the turbine casing 10 and its contents, the foundation block 4 being supported from the concrete base plate 5 via the concrete posts 6 and the springs 20, the base plate in turn resting on a concrete floor 7. On the other hand, the exhaust hood is independently supported by the condenser, which in turn is supported by the base plate 5. However, the provision of these independently supported structures causes a problem at the circular interface 24 between the bulkhead 16 and the exhaust hood 2, in that it is necessary to create and maintain a vacuum seal between the exhaust hood/condenser enclosure and the external environment, while maintaining substantial structural isolation between the bulkhead 16 and the exhaust hood 2

Dynamic isolation between bulkhead 16 and exhaust hood 2 must also be maintained, in that during start-up and shut-down operation of the turbine module 1, there will be thermally induced axial and radial movements (growth and shrinkage) of the turbine rotor shaft 19 the turbine casing relative to each other 10 and each of them relative to the exhaust hood/condenser assembly 2/3. Additionally, there may be transient movements of the turbine rotor shaft 19 and turbine casing as they adjust to onset and removal of steam loading on the turbine rotor blades and diaphragms and changes of bearing clearances and internal seal clearances during thermal growth and shrinkage. These various movements will have different rates of onset and reduction. Such relative movements also make it desirable to isolate movements of the exhaust hood/condenser assembly from movements of the turbine rotor shaft and the turbine casing.

To solve the above problems, a seal 18 is fixed to the periphery of each bulkhead 16, and to the confronting parts of the exhaust hood 2. The seal 18 provides a vacuum seal between the exterior and the interior of the exhaust hood 2, while allowing limited relative axial and vertical movement between the turbine casing 10 and the assembly formed by the exhaust hood 2 and the condenser 3.

A seal configuration capable of achieving the above is shown in FIGS. 3 and 4. Each seal 18 comprises a flexible gasket in the form of an annular diaphragm having a radially inner circumferential portion 30 sealed to the bulkhead 16, a radially outer circumferential portion 32 sealed to the exhaust hood 2, and a radially median resilient portion 34. To achieve the desired degree of flexibility of the gasket, the resilient portion 34 is convexly curved towards the interior of the exhaust hood, so that it approximates to a semi-toroidal shape, or, as seen in cross-section in FIGS. 3 and 4, a half sine-wave or U-shape. It is preferred that the resilient portion is convex towards the interior of the exhaust hood, because if it were convex towards the exterior, the large pressure drop across the gasket would exert compressive forces on the convex portion, thereby reducing its flexibility. The vacuum seal is achieved by clamping the radially inner and outer circumferential portions 30, 32 of the gasket to the bulkhead 16 and the exhaust hood 2 respectively, using radially inner and outer clamping flanges 36, 38.

To facilitate assembly and disassembly, the clamping flanges 36, 38 are segmented, but to maintain vacuum-tightness, the gasket 18 is unitary, being a complete annulus. For the purposes of the present description, the clamping flanges may be considered to comprise semi-circular upper and lower half-flanges, designated U and L respectively. At the discretion of the designer, each of these upper and lower half-flanges U and L may be divided into two or more segments. A diametral (horizontal) joint line (not shown) between the upper and lower half-flanges U and L is coincident with the sealing plane Ps of the upper and lower parts of the exhaust duct structures 10B, 10C and the exhaust hood 2.

Due to the proximity of the concrete foundation block, and the fact that, once in place, the lower parts of the exhaust hood and inner casing are not required to be dismantled, except in unusual circumstances, it is convenient to fix the lower part of each unitary annular gasket 18 to the inside surfaces of the exhaust hood 2 and the bulkhead 16. This is shown in FIG. 3 and is accomplished by means of an arrangement in which a lower half 36L of the radially inner clamping flange 36 is releasably secured with bolts or the like to an inside surface of the lower part of the bulkhead 16L, and a lower half 38L of the radially outer clamping flange 38 is similarly releasably secured to an inside surface of the lower part 2AL, 2BL of the exhaust hood 2. In this arrangement, the lower part 30L of the radially inner circumferential portion 30 of the gasket 18 is sealingly clamped between the lower half 36L of the radially inner clamping flange 36 and the inside surface of the lower part of the bulkhead 16L, and the lower part 32L of the radially outer circumferential portion 32 of the gasket is sealingly clamped between the lower half 38L of the radially outer clamping flange 38 and the inside surface of the lower part 2AL, 2BL of the exhaust hood.

To enable quick and convenient decoupling of the gasket 34 from the upper part 2AU, 2BU of the exhaust hood, the upper part of the gasket is sealed to the upper parts of the exhaust hood and the exhaust duct structure bulkhead by means of an arrangement of flanges and counter-flanges. This facilitates access to the interior of the turbine module 1 during outage of the turbine or for regular maintenance.

FIG. 4 shows how the upper part of the gasket assembly, comprising gasket 18, flanges 36, 38 and counter-flanges 40, 42 may be disassembled when removal of the upper part of the exhaust hood is required to access the interior of the turbine module 1. In the present embodiment, the upper half 36U of the radially inner clamping flange 36 is releasably secured with bolts or the like to the inside surface of a radially inner counter-flange 40, which in turn is releasably secured with bolts or the like to the outside surface of the upper part of the bulkhead 16U. Similarly, the upper half 38U of the radially outer clamping flange 38 is releasably secured to the inside surface of a radially outer counter-flange 42, which in turn is releasably secured to the outside surface of the upper part 2AU, 2BU of the exhaust hood 2. In this arrangement, the radially inner circumferential portion 30U of the upper part of the gasket 18 is sealingly clamped between the upper half 36U of the radially inner clamping flange 36 and the radially inner counter-flange 40, while the radially outer circumferential portion 32U of the upper part of the gasket 18 is sealingly clamped between the upper half 38U of the radially outer clamping flange 38 and the radially outer counter-flange 42.

The above-described arrangement of flanges and counter-flanges enables quick access to the exhaust hood and inner turbine casing interior. The radially outer counter-flanges 42 are released from the outside surfaces of the upper parts 2AU, 2BU of the exhaust hood, the upper parts of the exhaust hood are unbolted from its lower parts 2AL, 2BL, and the upper parts of the exhaust hood can then be lifted off, revealing the inner turbine casing 10.

The above embodiments have been described above purely by way of example, and modifications can be made within the scope of the appended claims. Thus, the breadth and scope of the claims should not be limited to the above-described exemplary embodiments. Each feature disclosed in the specification, including the claims and drawings, may be replaced by alternative features serving the same, equivalent or similar purposes, unless expressly stated otherwise.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. A vacuum seal arrangement installed between confronting co-planar portions of a low pressure steam turbine exhaust hood and a circular bulkhead that forms part of an exhaust duct structure of a steam turbine module, the vacuum seal arrangement comprising:
   a flexible gasket in the form of an annular diaphragm with a radially inner circumferential portion sealingly secured to the circular bulkhead by releasably secured segmented flanges;
   a radially outer circumferential portion sealingly secured to the exhaust hood by releasably secured segmented flanges; and
   a radially median resilient portion extending therebetween;
   wherein the segmented flanges comprise diametral joint lines between flange segments coincident with a sealing plane between lower and upper parts of each the exhaust hood and the circular bulkhead; and
   wherein an upper part of the gasket is releasably secured to the upper part of each the exhaust hood and the circular bulkhead by an arrangement of segmented flanges and counter-flanges.

2. The vacuum seal arrangement of claim 1, wherein the radially median resilient portion of the gasket comprises a portion convexly curved to approximate a semi-toroidal shape.

3. The vacuum seal arrangement of claim 2, wherein the radially median resilient portion is convexly curved toward an interior of the exhaust hood.

4. The vacuum seal arrangement of claim 1, wherein:
   the segmented flanges are releasably secured to inside surfaces of the counter-flanges, and the counter-flanges are releasably secured to an outside surface of the upper part of the circular bulkhead;
   the segmented flanges are releasably secured to inside surfaces of the counter-flanges, and the counter-flanges are releasably secured to an outside surface of the upper part of the exhaust hood;
   an inner circumferential portion of the upper part of the gasket is sealingly secured between the segmented flanges and the counter-flanges; and
   an outer circumferential portion of the upper part of the gasket is sealingly secured between the segmented flanges and the counter-flanges.

5. The vacuum seal arrangement of claim 4, wherein the lower part of the gasket is releasably secured to the lower parts of each of the exhaust hood and the circular bulkhead by the segmented flanges releasably secured to an inside surface of the lower part of the circular bulkhead;
   the segmented flanges releasably secured to an inside surface of the lower part of the exhaust hood;
   a radially inner circumferential portion of the lower part of the gasket releasably secured between the segmented flanges and the inside surface of the lower part of the circular bulkhead; and
   a radially outer circumferential portion of the lower part of the gasket releasably secured between the segmented flanges and the inside surface of the lower part of the exhaust hood.

6. The vacuum seal arrangement of claim 5, wherein the flanges are releasably secured by bolts or the like.

* * * * *